United States Patent
Iwachi

(10) Patent No.: US 11,525,023 B2
(45) Date of Patent: Dec. 13, 2022

(54) MODIFIED DIENE POLYMER AND METHOD FOR PRODUCING SAME

(71) Applicant: Toyo Tire Corporation, Itami (JP)

(72) Inventor: Taiki Iwachi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 16 days.

(21) Appl. No.: 15/734,735

(22) PCT Filed: Oct. 23, 2019

(86) PCT No.: PCT/JP2019/041502
§ 371 (c)(1),
(2) Date: Dec. 3, 2020

(87) PCT Pub. No.: WO2020/110521
PCT Pub. Date: Jun. 4, 2020

(65) Prior Publication Data
US 2021/0238334 A1    Aug. 5, 2021

(30) Foreign Application Priority Data
Nov. 30, 2018 (JP) .............................. JP2018-225314

(51) Int. Cl.
*C08F 279/02* (2006.01)

(52) U.S. Cl.
CPC ................... *C08F 279/02* (2013.01)

(58) Field of Classification Search
CPC ............................ C08F 279/02; C08F 230/02
See application file for complete search history.

(56) References Cited

U.S. PATENT DOCUMENTS

| | | | |
|---|---|---|---|
| 3,255,276 A | 6/1966 | Winter et al. | |
| 4,390,597 A | 6/1983 | Chauvel | |
| 5,292,817 A | 3/1994 | Grey et al. | |
| 5,310,808 A * | 5/1994 | Grey | C08F 279/02 525/289 |
| 5,328,958 A * | 7/1994 | Guo | C08F 279/02 525/66 |
| 2004/0220302 A1* | 11/2004 | Saegusa | C08L 69/00 524/161 |
| 2015/0065673 A1 | 3/2015 | Hogan et al. | |
| 2017/0022296 A1 | 1/2017 | Dire et al. | |

FOREIGN PATENT DOCUMENTS

| | | |
|---|---|---|
| JP | 67-111306 A | 7/1982 |
| JP | 2013-147555 A | 8/2013 |
| JP | 2015-512461 A | 4/2015 |
| JP | 2017-31370 A | 2/2017 |
| WO | 2013/125415 A1 | 8/2013 |

OTHER PUBLICATIONS

International Search Report dated Jan. 21, 2020, issued in counterpart International Application No. PCT/JP2019/041502 (2 pages).
Office Action dated Apr. 27, 2022, issued in counterpart JP Application No. 2018-225314, with English Translation. (8 pages).
Office Action dated Aug. 2, 2022, issued in counterpart JP Application No. 2018-225314, with English Translation. (4 pages).

\* cited by examiner

*Primary Examiner* — Jeffrey C Mullis
(74) *Attorney, Agent, or Firm* — WHDA, LLP

(57) ABSTRACT

A modified diene polymer according to an embodiment comprises a diene polymer having graft polymerized thereon a vinylphosphonic acid represented by the following formula (1). In the formula (1), $R^1$ and $R^2$ each independently represent a hydrogen atom or a hydrocarbon group having 1 to 10 carbon atoms, and $R^3$ represents a hydrogen atom or a methyl group.

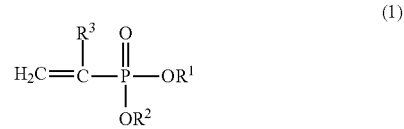

(1)

9 Claims, No Drawings

MODIFIED DIENE POLYMER AND METHOD FOR PRODUCING SAME

TECHNICAL FIELD

The present invention relates to modified diene polymer and a method for producing the same.

BACKGROUND ART

Conventionally, it is known that now properties are imparted to a diene polymer by introducing a functional group in a diene polymer such as diene rubber.

For example, Patent Literature 1 describes that a rubber composition having excellent low heat generation properties and wear resistance is obtained by graft polymerizing a polar group-containing monomer on a natural rubber latex, and a polar group-containing vinyl monomer is used as the polar group-containing monomer. Patent Literature 2 describes that a vinyl monomer having an alkoxysilane is added to a natural rubber latex and the vinyl monomer is graft polymerized on the natural rubber latex, and additionally, silica is formed by hydrolysis and condensation of the alkoxysilane. However, the patent literatures do not describe that a vinylphosphonic acid is graft polymerized.

On the other hand, Patent Literature 3 describes that phosphonic acid residues are directly bonded to carbon atoms constituting a main chain or a side chain of a modified polymer by reacting a phosphonic acid with a diene polymer using a manganese catalyst having an acetyl acetonate ligand. However, in this case, double bonds of the diene polymer are consumed in an addition reaction of phosphonic acid residues. Therefore, for example, the decrease in a vulcanization rate and a crosslinking rate in vulcanizing a modified diene polymer is concerned.

Patent Literature 4 describes that to introduce metallized organic phosphine in a polymer, metallized organic phosphine is introduced in a conjugated diene monomer to form a reactive polymer. However, the metallized organic phosphine is used as a polymerization initiator, and the patent literature does net describe that a vinylphosphonic acid is graft polymerized on a diene polymer.

CITATION LIST

Patent Literature

Patent Literature 1: JP-A-2013-147555
Patent Literature 2: WO2013/125415
Patent Literature 3: JP-A-2017-031370
Patent Literature 4: JP-A-2015-512461

SUMMARY OF THE INVENTION

Technical Problem

An embodiment of the present invention has an object to provide a novel modified diene polymer comprising a diene polymer having introduced therein a phosphonic acid group, and a method for producing the same.

Solution to Problem

The modified diene polymer according to the embodiment of the present invention comprises a diene polymer having graft polymerized thereon a vinylphosphonic acid represented by the following formula (1). The method for producing the modified dine polymer according to the embodiment of the present invention comprises graft polymerizing a vinylphosphonic acid represented by the following formula (1) on a diene polymer.

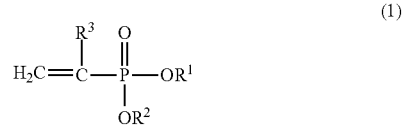

(1)

In the formula (1), $R^1$ and $R^2$ each independently represent a hydrogen atom or a hydrocarbon group having 1 to 10 carbon atoms, and $R^3$ represents a hydrogen atom or a methyl group.

Advantageous Effects of Invention

According to the embodiment of the present invention, a novel diene polymer comprising a diene polymer having graft polymerized thereon a vinyl phosphonic acid can be provided.

MODE FOR CARRYING OUT INVENTION

The modified diene polymer according to the present embodiment comprises a diene polymer having graft polymerized thereon a vinylphosphonic acid.

Diene Polymer

The diene polymer to be modified is a polymer containing a structural unit formed from a conjugated diene monomer. The diene polymer may be a homopolymer of one kind of a conjugate diene monomer, may be a copolymer of two or more kinds of conjugated diene monomers, and may be a copolymer of one kind or two or mere kinds of conjugated diene monomers and a vinyl monomer. Examples of the diene polymer include polyisoprene, polybutadiene, a styrene-butadiene copolymer, a styrene-isoprene copolymer, a butadiene-isoprene copolymer, an acrylonitrile-butadiene copolymer and an isobutene-isoprene copolymer. Those may be used in one kind alone and may be used by combining two or more kinds.

As the diene polymer, an unvulcanized diene rubber showing rubber elasticity by vulcanization is preferably used. Examples of the diene rubber include natural rubber (NR), isoprene rubber (IR), butadiene rubber (BR), styrene-butadiene rubber (SBR), styrene-isoprene copolymer rubber, butadiene-isoprene copolymer rubber, acrylonitrile-butadiene rubber (NBR) and butyl rubber (IIR). Those may be used in one kind alone and may be used by combining two or more kinds. Of those, at least one selected from the group consisting of natural rubber, isoprene rubber, butadiene rubber and styrene-butadiene rubber is preferred, and at least one selected from the group consisting of isoprene rubber, butadiene rubber and styrene-butadiene rubber is more preferred.

The diene polymer to be modified may be liquid and may be solid, at ordinary temperature (23° C.). The weight average molecular weight (Mw) of the diene polymer is not particularly limited. For example, the weight average molecular weight may be 2,000 to 3,000,000, may be 20,000 to 3,000,000, may be 100,000 to 3,000,000 and may be 400,000 to 2,600,000. In the present description, the weight average molecular weight is obtained in terms of polystyrene by the measurement with gel permeation chromatography (GPC).

Modifying Agent

A compound represented by the following formula (1) is used as the vinylphosphonic acid as a modifying agent.

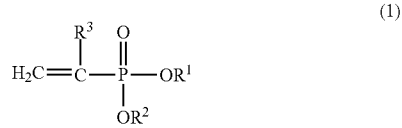

In the formula (1), $R^1$ and $R^2$ each independently represent a hydrogen atom or a hydrocarbon group having 1 to 10 carbon atoms. Examples of the hydrocarbon group in $R^1$ and $R^2$ include an aliphatic hydrocarbon group and an aromatic hydrocarbon group. The aliphatic hydrocarbon group may be straight chain, branched chain or cyclic. Examples of the aliphatic hydrocarbon group include an alkyl group having 1 to 10 carbon atoms (for example, a methyl group, an ethyl group, a propyl group or a butyl group) and an alkenyl group having 2 to 10 carbon atoms. An alkyl group having 1 to 4 carbon atoms is more preferred. Examples of the aromatic hydrocarbon group include an aryl group having 6 to 10 carbon atoms (for example, a phenyl group, a tolyl group or a xylyl group) and an aralkyl group having 7 to 10 carbon atoms (for example, a benzyl group or a phenethyl group). As one embodiment, both $R^1$ and $R^2$ may be a hydrogen atom and may be an alkyl group having 1 to 10 (more preferably, 1 to 4) carbon atoms.

In the formula (1), $R^3$ represents a hydrogen atom or a methyl group, and preferably a hydrogen atom.

Modified Diene Polymer

In the modified diene polymer according to the present embodiment, the vinylphosphonic acid is graft polymerized on the diene polymer. Therefore, the modified diene polymer has a skeleton (that is, a stem) comprising the diene polymer (preferably, a diene rubber) and a graft chain represented by the following formula (2) bonded to the skeleton.

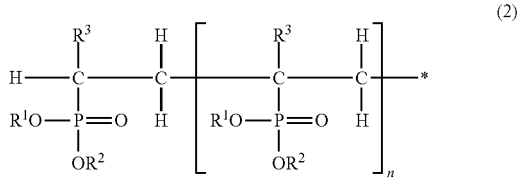

$R^1$, $R^2$ and $R^3$ in the formula (2) are the same as $R^1$, $R^2$ and $R^3$ in the formula (1), n is an integer of 0 or more, and * is a bonding position to a carbon atom in the diene polymer.

In detail, a vinyl group of the vinylphosphonic acid may be bended to a carbon atom adjacent to a carbon-carbon double bond contained in the diene polymer, and a graft chain represented by the formula (2) may be grown. For example, in the diene polymer having an isoprene unit, a structural unit having a graft chain introduced therein may be a unit having a structure represented by the following formula (3). Thus, the carbon-carbon double bond of the diene polymer is not consumed, and a graft chain is formed on a carbon atom adjacent to the carbon-carbon double bond. Therefore, it is considered that the decrease in vulcanization rate and crosslinking density in vulcanizing the modified diene polymer obtained can be suppressed.

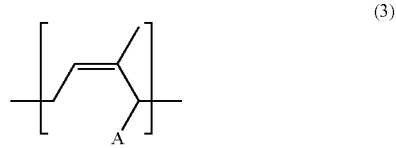

A in the formula (3) represents a graft chain represented by the formula (2).

Modification ratio of the modified diene polymer is not particularly limited. For example, the modification ratio may be 0.1 to 50 mol %, may be 0.5 to 30 mol %, may be 1 to 20 mol %, and may be 2 to 10 mol %. The modification ratio used herein means a ratio of the number of moles of the structural units having the graft chain introduced therein to the number of moles of the total structural units constituting the modified diene polymer.

The modified diene polymer may be liquid and may be solid, at ordinary temperature (23° C.). The weight average molecular weight (Mw) of the modified diene polymer is not particularly limited. For example, the weight average molecular weight may be 2,000 to 3,000,000, may be 20,000 to 3,000,000 and may be 100,000 to 3,000,000. The modified diene polymer is preferably a solid modified diene rubber at ordinary temperature, and its weight average molecular weight is preferably 400,000 to 2,600,000.

The glass transition temperature (Tg) of the modified diene polymer is not particularly limited, but is preferably −70° C. to −20° C., more preferably −70° C. to −50° C., and still more preferably −65° C. to −60° C. The glass transition temperature used herein is measured by a differential scanning calorimetry (DCS) method according to JIS K7121.

Method for Producing Modified Diene Polymer

The method for producing a modified diene polymer according to the present embodiment is a method of graft polymerizing the vinylphosphonic acid on a diene polymer. As the diene polymer, an aqueous emulsion in which the diene polymer is present in a micellar state in water as a protonic solvent, that is, a latex, may be used, or a solution of the diene polymer dissolved in an organic-solvent may be used. As one embodiment, a rubber latex, that is, a latex of a diene rubber, is preferably used as the diene polymer. The concentration of those is not particularly limited. For example, in the case of a latex, the solid content concentration of the diene polymer may be 5 to 70% by mass, and may be 10 to 50% by mass. Furthermore, in the case of a solution, the solid content concentration may be 1 to 30% by mass, and may be 1 to 10% by mass.

In the graft polymerization, the vinylphosphonic acid and a polymerization initiator are added to a latex or a solution of the diene polymer, followed by stirring and mixing. In the case of the latex, an emulsifier and a buffer may be further added. The pH in the case of the latex is not particularly limited, and may be, for example, pH 5 to 12.

The amount of the vinylphosphonic acid added is not particularly limited, out is preferably 0.20 to 4.0 moles and more preferably 0.25 to 3.0 moles, per 1 kg of the diene polymer. When the amount of the vinylphosphonic acid added is 0.20 moles or more, the effect of improving physical properties of the modified diene polymer can be enhanced. On the other hand, when the amount is 4.0 moles or less, coagulation of the modified diene polymer during the graft polymerization reaction can be suppressed.

The polymerization initiator is not particularly limited, and a polymerization initiator capable of radical graft polymerizing the vinylphosphonic acid as a monomer can be used. Examples of the polymerization initiator include peroxides such as tert-butyl hydroperoxide, di-tert-butyl peroxide, potassium persulfate, ammonium persulfate, benzoyl peroxide, hydrogen peroxide, cumene hydroperoxide and 2,2-azobisisobutyronitrile. Those may be used in one kind alone and may be used by combining two or more kinds.

From that the polymerization temperature can be decreased, a redox polymerization initiator may be used as the polymerization initiator. Examples of a reducing agent that is combined with the peroxide, as the redox polymerization initiator include tetraethylene pentamine, mercaptans, sodium hydrogen sulfite, reducing metal ion and ascorbic acid.

The amount of the polymerization initiator added is not particularly limited. For example, the amount may be 0.01 to 5 moles and may be 0.01 to 0.1 moles, based on the vinylphosphonic acid.

The latex or solution containing the modified diene polymer obtained by the graft polymerization step is coagulated and dried to obtain the modified diene polymer. The coagulation method is not particularly limited. The latex or solution may be coagulated using formic acid and may be coagulated using a hydrophilic organic solvent such as acetone or methanol. The drying method is not particularly limited. For example, ordinary dryer such as a vacuum dryer or a hot air dryer can be used. The coagulate may be washed with water before drying.

In the modified diene polymer according to the present embodiment, a phosphonic acid group as a polar group is introduced in the diene polymer. Therefore, for example, in the case of adding silica as a filler to a composition containing the modified diene polymer, the effect of improving dispersibility of the silica can be expected.

Furthermore, the coagulation of a phosphonic acid group by a hydrogen bond can be expected during the reaction by the graft polymerization and additionally, the formation of a nanomatrix structure by a graft chain can be expected. As a result, tensile strength can be improved by those effects.

The uses of the modified diene polymer according to the present embodiment are not particularly limited, and the modified diene polymer can be used in various rubber products and resin products.

EXAMPLES

Examples of the present invention are described below, but the present invention is non construed as being limited to those examples.

Each measurement method of the modified diene polymer is as follows.

$^{31}$P-NMR $^{31}$P-NMR quantitative spectrum was measured by 400 ULTRASHIELD™ PLUS manufactured by BLUKER using a measurement sample dissolved in deuterated chloroform. Chemical shift correction was conducted using triphenylphosphine as an external standard.

Modification Ratio

Modification ratio was calculated from $^{13}$C-NMR quantitative spectrum. $^{13}$C-NMR quantitative spectrum was measured by 400 ULTRASHIELD™ PLUS manufactured by BLUKER using a measurement sample dissolved in deuterated chloroform. Modification ratio that is a ratio of the number of moles of structural units having graft chain introduced therein to the number of moles of total structural units constituting the modified diene polymer was calculated by integral ratio of the spectrum derived from a graft chain (using spectrum of 16 ppm) and the spectrum derived from a main chain (using spectrum of 23 ppm).

Weight Average Molecular Weight (Mw)

Mw in terms of polystyrenes was obtained by the measurement with gel permeation chromatography (GPC). In detail, a measurement sample dissolved in tetrahydrofuran (THF) was used. Using LC-20A manufactured by Shimadzu Corporation, after passing the sample through a filter, the sample was passed through a column (Shodex KL-806) at a temperature of 40° C. in a flow rate of 1.0 mL/min, and then detected by a differential bending detector (RI).

Glass Transition Temperature (Tg)

The glass transition temperature was measured by a differential scanning calorimetry (DSC) method in a temperature rising rate of 20° C./min (measurement temperature range: −130° C. to 200° C.) according to JIS K7121.

Details of the reagents used in the examples are as follows.

IR latex: Isoprene rubber latex, Califlex IR0401 SU Latex manufactured by KRATON Polymer Japan Disodium hydrogen phosphate: manufactured by FUJIFILM Wako Pure Chemical Corporation Sodium dodecyl sulfate: manufactured by FUJIFILM Wako Pure Chemical Corporation Tert-butyl hydroperoxide: manufactured by Tokyo Chemical Industry Co., Ltd.

Tetraethylene pentamine: manufactured by Tokyo Chemical Industry Co., Ltd.

IR2200: Isoprene rubber, JSR IR2200 manufactured by JSR Corporation

Toluene: manufactured by Nacalai Tesque

Vinylphosphonic acid: manufactured by Tokyo Chemical Industry Co., Ltd.

Diethyl vinylphosphonate: manufactured by Tokyo Chemical Industry Co., Ltd.

Example 1

Water was added to IR latex to prepare 103 g of a latex having a rubber solid content concentration of 20% by mass. 0.10 g of sodium dodecyl sulfate was added to the latex, followed by stirring for 1 hour in a nitrogen atmosphere. Thereafter, 0.18 mL of tert-butyl hydroperoxide, 0.25 mL of tetraethylene pentamine and 0.54 g of vinylphosphonic acid were further added, followed by stirring at 30° C. for 2 hours. The amount of the vinylphosphonic acid added is 0.25 moles per 1 kg of the isoprene rubber. The reaction solution obtained was added dropwise to acetone to coagulate a rubber component. The rubber component obtained was washed with water and dried at 50° C. under reduced pressure. As a result, a modified isoprene rubber having vinylphosphonic acid graft polymerized thereon was obtained as a target product. It was confirmed from $^{31}$P-NMR spectrum of the product obtained that phosphonic acid groups were introduced in the isoprene rubber polymer.

The modified isoprene rubber obtained had $^{31}$P-NMR (CDCl$_3$), d=23.1 (br). Furthermore, the modification ratio was 10 mol %, Mw was 564,000 and Tg was −62° C.

Example 2

Water was added to IR latex to prepare 200 g of a latex having a rubber solid content concentration of 20% by mass. 0.13 g of sodium dodecyl sulfate was added to the latex, followed by stirring for 1 hour in a nitrogen atmosphere. Thereafter, 0.36 mL of tert-butyl hydroperoxide, 0.50 mL of tetraethylene pentamine and 6.4 g of vinylphosphonic acid were further added, followed by stirring at 30° C. for 2 hours. The amount of the vinylphosphonic acid added is 1.5 moles per 1 kg of the isoprene rubber. The reaction solution obtained was added dropwise to acetone to coagulate a rubber component. The rubber component obtained was washed with water and dried at 50° C. under reduced pressure. As a result, a modified isoprene rubber having vinylphosphonic acid graft polymerized thereon was obtained as a target product. It was confirmed from $^{31}$P-NMR spectrum of the product obtained that phosphonic acid groups were introduced in the isoprene rubber polymer.

The modified isoprene rubber obtained had $^{31}$P-NMR (CDCl$_3$), d=23.1 (br). Furthermore, the modification ratio was 10 mol %, Mw was 565,000 and Tg was −62° C.

Example 3

Water was added to IR latex to prepare 103 g of a latex having a rubber solid content concentration of 20% by mass. 0.11 g of disodium hydrogen phosphate and 0.10 g of sodium dodecyl sulfate were added to the latex, followed by stirring for 1 hour in a nitrogen atmosphere. Thereafter, 0.18 mL of tert-butyl hydroperoxide, 0.25 mL of tetraethylene pentamine and 3.45 g of diethyl vinylphosphonate were further added, followed by stirring at 30° C. for 2 hours. The amount of the diethyl vinylphosphonate added is 1.05 moles per 1 kg of the isoprene rubber. The reaction solution obtained was added dropwise to acetone to coagulate a rubber component. The rubber component obtained was washed with water and dried at 50° C. under reduced pressure. As a result, a modified isoprene rubber having diethyl vinylphosphonate graft polymerized thereon was obtained as a target product. It was confirmed from $^{31}$P-NMR spectrum of the product obtained that phosphonate groups were introduced in the isoprene rubber polymer.

The modified isoprene obtained had $^{31}$P-NMR (CDCl$_3$), d=36.7 (br). Furthermore, the modification ratio was 10 mol %, Mw was 2,060,000 and Tg was −62° C.

Example 4

6.0 g of IR 2200 was dissolved in 200 mL of toluene to prepare a rubber solution. 48 mg of tert-butyl hydroperoxide, 70 mg of tetraethylene pentamine and 0.97 g of vinylphosphonic acid were added to the rubber solution obtained, followed by stirring at 30° C. for 2 hours. The amount of the vinylphosphonic acid added is 1.5 moles per 1 kg of the isoprene rubber. The reaction solution obtained was added dropwise to acetone to coagulate a rubber component. The rubber component obtained was washed with water and dried at 50° C. under reduced pressure. As a result, a modified isoprene rubber having vinylphosphonic acid graft polymerized thereon was obtained as a target product. It was confirmed from $^{31}$P-NMR spectrum of the product obtained that phosphonic acid groups were introduced in the isoprene rubber polymer.

The modified isoprene rubber obtained had $^{31}$P-NMR (CDCl$_3$), d=19.8 (br). Furthermore, the modification ratio was 2 mol %, Mw was 485,000 and Tg was −65° C.

Example 5

6.0 g of IR 2200 was dissolved in 200 mL of toluene to prepare a rubber solution. 96 mL of tert-butyl hydroperoxide, 140 mg of tetraethylene pentamine and 1.94 g of vinylphosphonic acid were added to the rubber solution obtained, followed by stirring at 30° C. for 2 hours. The amount of the vinylphosphonic acid added is 3.0 moles per 1 kg of the isoprene rubber. The reaction solution obtained was added dropwise to acetone to coagulate a rubber component. The rubber component obtained was washed with water and dried at 50° C. under reduced pressure. As a result, a modified isoprene rubber having vinylphosphonic acid graft polymerized thereon was obtained as a target product. It was confirmed from $^{31}$P-NMR spectrum of the product obtained that phosphonic acid groups were introduced in the isoprene rubber polymer.

The modified isoprene rubber obtained had $^{31}$P-NMR (CDCl$_3$), d=20.3 (br). Furthermore, the modification ratio was 3 mol %, Mw was 626,000 and Tg was −64° C.

Tensile product of the unvulcanized modified isoprene rubbers of Examples 1 and 3 were measured. As Comparative Example 1, the tensile product of an unmodified isoprene rubber was measured. As the unmodified isoprene rubber, an unvulcanized isoprene rubber obtained by adding dropwise the IR latex to acetone to coagulate and after washing with water, drying at 50° C. under reduced pressure was used. The measurement method of the tensile product is as follows.

Tensile Product

An unvulcanized rubber was molded into a sheet form having a thickness of 5 mm. A sample having 60 mm vertical and 20 mm horizontal cut out of the sheet was subjected to a tensile test using an autograph, and tensile product (TB (tensile strength)×EB (elongation at break)) as fracture characteristics was obtained. Fracture characteristics are excellent as the numerical value is large.

The results are shown in Table 1 below. In the modified isoprene rubbers of Examples 1 and 3, the tensile product is improved in the evaluation of an unvulcanized rubber alone as compared with the unvulcanized isoprene rubber of Comparative Example 1, and the effect of improving properties by the modification with a vinylphosphonic acid was recognized.

TABLE 1

|  | Tensile product [MPa · %] |
| --- | --- |
| Modified isoprene of Example 1 | 78.8 |
| Modified isoprene of Example 3 | 60.8 |
| Unmodified isoprene of Comparative Example 1 | 59.5 |

The invention claimed is:

1. A modified diene rubber comprising a diene rubber having graft polymerized thereon a monomer consisting of a vinylphosphonic acid represented by the following formula (1):

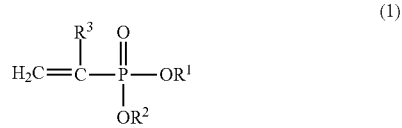

wherein $R^1$ and $R^2$ each independently represent a hydrogen atom or a hydrocarbon group having 1 to 10 carbon atoms, and $R^3$ represents a hydrogen atom or a methyl group,
wherein the modified diene rubber has a glass transition temperature of −70° C. to −20° C. and has a weight average molecular weight of 400,000 to 2,600,000.

2. The modified diene rubber according to claim 1, having a skeleton comprising the diene rubber and a graft chain represented by the following formula (2) bonded to the skeleton:

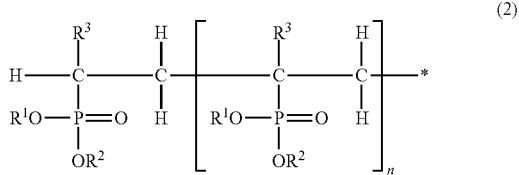

wherein $R^1$ and $R^2$ each independently represent a hydrogen atom or a hydrocarbon group having 1 to 10 carbon atoms, $R^3$ represents a hydrogen atom or a methyl group, n is an integer of 0 or more, and * is a bonding position to a carbon atom in the diene rubber.

3. The modified diene rubber according to claim 2, having a structural unit represented by the following formula (3):

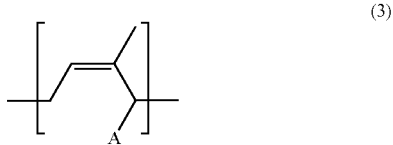

wherein A represents a graft chain represented by the formula (2).

4. The modified diene rubber according to claim 1, wherein the diene rubber is at least one selected from the group consisting of natural rubber, isoprene rubber, butadiene rubber, styrene-butadiene rubber, styrene-isoprene copolymer rubber, butadiene-isoprene copolymer rubber, acrylonitrile-butadiene rubber and butyl rubber.

5. The modified diene rubber according to claim 1, wherein $R^1$ and $R^2$ each independently represent a hydrogen atom or a hydrocarbon group having 1 to 4 carbon atoms.

6. A method for producing a modified diene rubber, comprising graft polymerizing a monomer consisting of a vinylphosphonic acid represented by the following formula (1) on a diene rubber:

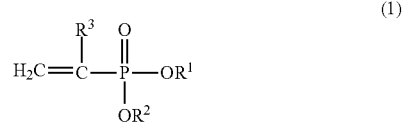

wherein $R^1$ and $R^2$ each independently represent a hydrogen atom or a hydrocarbon group having 1 to 10 carbon atoms, and $R^3$ represents a hydrogen atom or a methyl group,.
wherein the modified diene rubber has a glass transition temperature of −70° C. to −20° C. and has a weight average molecular weight of 400,000 to 2,600,000.

7. The method for producing a modified diene rubber according to claim 6, wherein the amount of the vinylphosphonic acid added is 0.20 to 4.0 moles per 1 kg of the diene rubber.

8. The method for producing a modified diene rubber according to claim 6, wherein a rubber latex is used as the diene rubber.

9. The method for producing a modified diene rubber according to claim 6, comprising adding the vinylphosphonic acid and a polymerization initiator to a latex or solution of the diene rubber to conduct a graft polymerization, and coagulating and drying the resulting latex or solution containing the diene rubber.

* * * * *